(12) United States Patent
Lu et al.

(10) Patent No.: US 12,734,892 B2
(45) Date of Patent: Sep. 15, 2026

(54) VEHICLE AND INSULATION MONITORING CIRCUIT FOR VEHICLE BATTERY

(71) Applicant: SAIC MOTOR CORPORATION LIMITED, Shanghai (CN)

(72) Inventors: Kewei Lu, Shanghai (CN); Ji Li, Shanghai (CN); Wendi Chen, Shanghai (CN); Huake Zheng, Shanghai (CN); Xiang Ji, Shanghai (CN)

(73) Assignee: SAIC MOTOR CORPORATION LIMITED, Shanghai (CN)

( * ) Notice: Subject to any disclaimer, the term of this patent is extended or adjusted under 35 U.S.C. 154(b) by 776 days.

(21) Appl. No.: 18/025,088

(22) PCT Filed: Sep. 7, 2020

(86) PCT No.: PCT/CN2020/113851

§ 371 (c)(1),
(2) Date: Mar. 7, 2023

(87) PCT Pub. No.: WO2022/047807

PCT Pub. Date: Mar. 10, 2022

(65) Prior Publication Data

US 2023/0311664 A1 Oct. 5, 2023

(51) Int. Cl.
*B60L 3/00* (2019.01)
*B60L 58/10* (2019.01)

(52) U.S. Cl.
CPC ........... *B60L 3/0069* (2013.01); *B60L 3/0046* (2013.01); *B60L 58/10* (2019.02)

(58) Field of Classification Search
CPC ...... B60L 3/0069; B60L 3/0046; B60L 58/10; G01R 31/52; G01R 31/006; G01R 27/025; G01R 31/382
See application file for complete search history.

(56) References Cited

U.S. PATENT DOCUMENTS 5,481,194 A * 1/1996 Schantz .................. B60L 50/51 340/650
6,906,525 B2 * 6/2005 Suzuki .................. B60L 3/0023 324/509

(Continued)

FOREIGN PATENT DOCUMENTS

CN 104635057 A 5/2015
CN 105785129 A 7/2016

(Continued)

OTHER PUBLICATIONS

Extended European Search Report Issued in EP App. No. 20952049. 3, dated Jun. 6, 2024 (41 Pages).

(Continued)

*Primary Examiner* — Jared Fureman
(74) *Attorney, Agent, or Firm* — Nixon Peabody LLP

(57) ABSTRACT

A vehicle and an insulation monitoring circuit for vehicle battery, the insulation monitoring circuit acquiring power from the vehicle battery and comprising a voltage-to-frequency conversion circuit (11), an RC series circuit (12), a first peak sampling circuit (13), and an alarm trigger module (14); the voltage-to-frequency conversion circuit (11) outputs a low-frequency pulse signal and injects same via the RC series circuit (12) into a high-voltage system connected to the vehicle battery; the first peak sampling circuit (13) performs sampling on a voltage signal of a resistor rear end in the RC series circuit (12) and feeds back same to the voltage-to-frequency conversion circuit (11), such that the outputted low-frequency pulse signal is adapted to the vehicle battery; and the alarm trigger module (14) performs processing on the voltage signal of the resistor rear end in the RC series circuit (12) and outputs an alarm trigger signal. The entire insulation monitoring process can be implemented without the control of the vehicle BMS, and real-time insulation monitoring can be implemented as long as (Continued)

the vehicle battery is intact; in addition, the use of a closed-loop output low-frequency pulse signal enables adaptation to the capacitance between the high and low voltage circuits of the vehicle battery, thereby achieving stable and reliable insulation monitoring.

12 Claims, 2 Drawing Sheets

(56) References Cited

U.S. PATENT DOCUMENTS

| | | | | |
|---|---|---|---|---|
| 7,994,799 | B2 * | 8/2011 | Tachizaki | H02H 3/044<br>324/551 |
| 10,120,009 | B2 * | 11/2018 | Mizoguchi | G01R 31/005 |
| 10,763,552 | B2 | 9/2020 | Dan et al. | |
| 12,078,685 | B2 * | 9/2024 | Mizoguchi | G01R 31/52 |
| 2008/0197855 | A1 | 8/2008 | Uchida | |

FOREIGN PATENT DOCUMENTS

| | | | |
|---|---|---|---|
| CN | 206235668 | U | 6/2017 |
| CN | 108680793 | A | 10/2018 |
| CN | 109324231 | A | 2/2019 |
| JP | 2018115971 | A | 7/2018 |

OTHER PUBLICATIONS

International Search Report in international application No. PCT/CN2020/113851 mailed Mar. 2, 2021, 4 pp.

* cited by examiner

VEHICLE AND INSULATION MONITORING CIRCUIT FOR VEHICLE BATTERY

CROSS REFERENCE TO RELATED APPLICATIONS

This application is a U.S. National Stage Entry of International Application No. PCT/CN2020/113851, filed Sep. 7, 2020, which is hereby incorporated by reference herein in its entirety.

TECHNICAL FIELD

This application with its embodiments relates to circuit technologies, and in particular, to vehicles and insulation monitoring circuits for vehicle battery.

BACKGROUND

With continuous developments of new energy vehicles, safety performances of vehicles are gaining more attention. Working voltage of a vehicle power battery is usually at 400 to 1000 V, which exceeds the safe voltage for human body. In the case of electric leakage accidents, the vehicle power battery may jeopardize the safety of drivers and/or passengers of the vehicle. Therefore, monitoring insulation status of the vehicle power battery in real time turns out to be necessary.

In related technologies, insulation monitoring is usually realized with a balanced bridge method. In this method, usually, the closing of respective bridge arms in the balanced bridge is controlled with software to obtain sampling values of each point, followed with insulation values calculation. However, in the case of vehicle dormancy, the BMS of the vehicle is not in a work status and cannot send control signals to control the closing of respective bridge arms, which renders monitoring the insulation status of the vehicle battery in real time not possible.

SUMMARY

In view of this, one of the technical problems solved by this application with its embodiments is to provide a vehicle and an insulation monitoring circuit for vehicle battery, to at least overcome the above-mentioned defects in the art.

In the first aspect, this application with its embodiments provides an insulation monitoring circuit for vehicle battery, wherein the insulation monitoring circuit obtains power supply from the vehicle battery, and the insulation monitoring circuit comprises: a voltage-to-frequency conversion circuit, an RC series circuit, a first peak sampling circuit, and an alarm trigger module; the voltage-to-frequency conversion circuit is configured for outputting a low-frequency pulse signal, and injecting the low-frequency pulse signal into a high-voltage system connected to the vehicle battery via the RC series circuit; the first peak sampling value is configured for sampling a voltage signal of a resistor rear end in the RC series circuit, and transferring a first peak detection signal indicative of the peak value of the voltage signal back to the voltage-to-frequency conversion circuit such that the low-frequency pulse signal output by the voltage-to-frequency conversion circuit is adapted to the vehicle battery; and the alarm trigger module is configured for processing the voltage signal of the resistor rear end in the RC series circuit, and outputting an alarm-triggering signal.

Optionally, in an embodiment of the present application, the alarm trigger module comprises a voltage jump detection submodule and a first comparator; the voltage jump detection submodule is configured for detecting a voltage jump signal of the resistor rear end in the RC series circuit, and generating a second peak detection signal indicative of the peak value of the voltage jump signal, the first comparator is configured for comparing the second peak detection signal with a first preset voltage threshold such that an alarm-triggering signal is output in the case that the second peak detection signal is below the first preset voltage threshold.

Optionally, in an embodiment of the present application, the voltage jump detection submodule comprises a differential circuit; the differential circuit is connected to the resistor rear end in the RC series circuit, and is configured for differentiating the voltage signal of the resistor rear end in the RC series circuit, generating a voltage jump signal.

Optionally, in an embodiment of the present application, the voltage jump detection submodule further comprises a second peak sampling circuit; the second peak sampling circuit is connected to an output terminal of the differential circuit for sampling a voltage jump signal and providing the second peak detection signal indicative of the peak value of the voltage jump signal.

Optionally, in an embodiment of the present application, the alarm trigger module further comprises a trigger-delaying submodule, and the trigger-delaying submodule is connected to an output terminal of the first comparator, and is configured for outputting the alarm-triggering signal in the case that an output signal of the first comparator indicates that the insulation value of the vehicle battery is relatively low for a period of time.

Optionally, in an embodiment of the present application, the trigger-delaying submodule comprises an integrating circuit and a second comparator, an input terminal of the integrating circuit is connected to an output terminal of the first comparator, an output terminal of the integrating circuit is connected to an non-inverting input terminal of the second comparator, and an inverting input terminal of the second comparator is connected to the second preset voltage threshold; the integrating circuit is configured for integrating the output signal of the first comparator to generate a signal accumulation value, and the second comparator is configured for outputting the alarm-triggering signal in the case that the signal accumulation value is above the second preset voltage threshold.

Optionally, in an embodiment of the present application, the voltage-to-frequency conversion circuit comprises a first operational amplifier, a first resistor, a second resistor, a third resistor, a fourth resistor, a fifth resistor and a first capacitor; a non-inverting input terminal of the first operational amplifier is respectively connected to an output terminal of the first peak sampling circuit via the first resistor and connected to the ground voltage via the second resistor and the third resistor; an inverting input terminal of the operational amplifier is connected to the ground voltage via the first capacitor; and an output terminal of the first operational amplifier is respectively connected to the first end of the resistor in the RC series circuit, connected to a node at the connection position of the second resistor and the third resistor via the fourth resistor, and connected to an inverting input terminal of the first operational amplifier via the fifth resistor.

Optionally, in an embodiment of the present application, the first peak sampling circuit comprises a second operational amplifier, a first peak detector diode, a second capacitor and a first voltage buffer, a non-inverting input terminal of the second operational amplifier is connected to a second end of the resistor in the RC series circuit, a negative-inverting input terminal of the second operational amplifier is connected to an output terminal of the first voltage buffer, an output terminal of the second operational amplifier is connected to an input terminal of the first voltage buffer and a first end of the second capacitor via the first peak detector diode, a second end of the second capacitor is connected to the ground voltage, and an output terminal of the first voltage buffer is connected to an input terminal of the voltage-to-frequency conversion circuit.

Optionally, in an embodiment of the present application, the circuit further comprises a DC/DC circuit. An input terminal of the DC/DC circuit is connected to the vehicle battery for converting the DC high voltage of the vehicle battery into DC low voltage to supply power for the insulation monitoring circuit.

In a second aspect, an embodiment of the present application provides a vehicle, which is characterized by comprising a vehicle battery and an insulation monitoring circuit for vehicle battery according to any one of the first aspect.

In the embodiment of the present application, since the voltage-to-frequency conversion circuit is configured for outputting a low-frequency pulse signal according to the voltage signal of its input terminal, and injecting the low-frequency pulse signal into a high-voltage system connected to the vehicle battery via the RC series circuit, the alarm trigger module is configured for processing the voltage signal of the resistor rear end in the RC series resistor, the entire insulation monitoring process is not controlled by the battery management system of the vehicle, so as long as the vehicle battery is complete, the real-time insulation monitoring can be performed. At the same time, since a voltage signal of the resistor rear end in the RC series resistor is sampled and transferred back to the voltage-to-frequency conversion circuit such that the low-frequency pulse signal output by the voltage-to-frequency conversion circuit is adapted to the capacitance in the high- and low-voltage circuits of the vehicle battery, then a stable, reliable insulation monitoring can be performed.

BRIEF DESCRIPTION OF THE DRAWINGS

Hereinafter, some specific embodiments of the embodiments of the present application will be described in detail with reference to the accompanying figures in an exemplary manner rather than a restrictive manner. The same reference numerals in the figures designate the same or similar components or parts. Those skilled in the art will appreciate that these figures are not necessarily drawn to scale. In the figures.

DETAILED DESCRIPTION

Specific implementations of embodiments of the present application will be further described below in conjunction with the accompanying figures of the embodiments of the present application.

Figure 1:
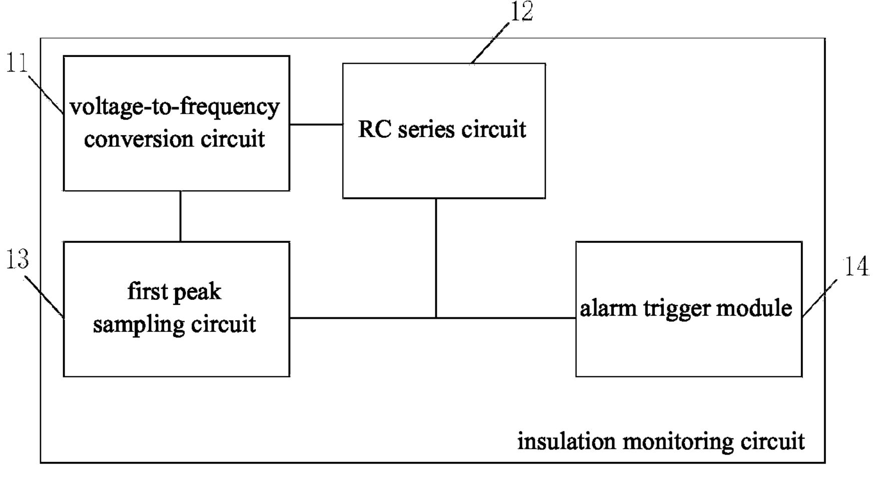
FIG. 1 is a schematic structural diagram of an insulation monitoring circuit for a vehicle battery provided in an embodiment of the present application.

FIG. 1 is a schematic structural diagram of an insulation monitoring circuit for a vehicle battery provided in an embodiment of the present application. The insulation monitoring circuit obtains power supply from the vehicle battery. As shown in FIG. 1, the insulation monitoring circuit comprises: a voltage-to-frequency conversion circuit 11, an RC series circuit 12, a first peak sampling circuit 13, and an alarm trigger module 14. The voltage-to-frequency conversion circuit 11 is configured for outputting a low-frequency pulse signal. The low-frequency pulse signal can be injected, via the RC series circuit 12, into a high-voltage system connected to the vehicle battery. The first peak sampling circuit 13 is configured for sampling the voltage signal of the resistor rear end in the RC series circuit 12. The first peak detection signal indicative of the peak value of the voltage signal can be transferred back to the voltage-to-frequency conversion circuit 11 such that the low-frequency pulse signal outputted by the voltage-to-frequency conversion circuit 11 is adapted to the vehicle battery. The alarm trigger module 14 is configured for processing the voltage signal of the resistor rear end in the RC series circuit 12. An alarm-triggering signal can be outputted.

Specifically, the voltage-to-frequency conversion circuit 11 obtains power supply from the vehicle battery; an output terminal of the voltage-to-frequency conversion circuit 11 is connected to an input terminal of the RC series circuit 12; an output terminal of the RC series circuit 12 is connected to a high-voltage system connected to the vehicle battery; the voltage-to-frequency conversion circuit 11 is configured for converting the voltage signal of its input terminal into a low-frequency pulse signal, and injecting the low-frequency pulse signal into a high-voltage system connected to the vehicle battery via the RC series circuit 12. Therein, the RC series circuit 12 is composed of a resistor and a capacitor connected in series, wherein the first end of the resistor is connected to an output terminal of the voltage-to-frequency conversion circuit 11; the second end of the resistor is connected to the first end of the capacitor; and the second end of the capacitor is connected to a high-voltage system connected to the vehicle battery, e.g. connected to a positive terminal of the vehicle battery, such that the low-frequency pulse signal generated by the voltage-to-frequency conversion circuit 11 is injected into the high-voltage signal connected to the vehicle battery. In this embodiment, since the first end of the resistor is connected to the output terminal of the voltage-to-frequency conversion circuit 11 and the second end of the resistor is connected to the first end of the capacitor, the rear end of the resistor can be referred to as the second end of the resistor. Furthermore, it is noted that the resistor can be obtained by connecting multiple resistors in series and/or in parallel, and the capacitor also can be obtained by connecting multiple capacitors in parallel and/or in series, which is not limited in this embodiment.

The input terminal of the first peak sampling circuit 13 is connected to the rear end of the resistor in the RC series circuit 12. The output terminal of the first peak sampling circuit 13 is connected to an input terminal of the voltage-to-frequency conversion circuit 11. Since the first end of the resistor in the RC series circuit 12 is connected to an output terminal of the voltage-to-frequency conversion circuit 11, a feedback loop is formed between the output terminal and the input terminal of the voltage-to-frequency conversion circuit 11 through the resistor in the RC series circuit 12 and the first peak sampling circuit 13. The first peak sampling circuit 13 is configured for sampling the voltage signal of the resistor rear end in the RC series circuit 12 and generating a first peak detection signal indicative of the peak value of the voltage signal. The first peak detection signal can be transferred back to the voltage-to-frequency conversion circuit 11 such that the low-frequency pulse signal outputted by the voltage-to-frequency conversion circuit 11 is adapted to the vehicle battery. For example, in a single frequency period of the low-frequency pulse signal outputted by the voltage-to-frequency conversion circuit 11, the voltage of the resistor rear end in the RC series resistor is the same as the peak value of the low-frequency pulse signal outputted by the voltage-to-frequency conversion circuit 11 such that the insulation monitoring circuit can be adapt to the capacitor in the high- and low-voltage circuits of the vehicle battery. It increases the stability of insulation monitoring and improves the safety performance of the whole vehicle.

In the case that the voltage-to-frequency conversion circuit 11 outputs a suitable low-frequency pulse signal, the voltage jump value of the resistor rear end in the RC series circuit 12 is the series voltage division of the resistor and the parallel value of the insulation resistor of the positive terminal and the negative terminal of the vehicle battery to the ground. that is to say, the voltage jump value is positively correlated with the insulation resistor of the vehicle battery. An input terminal of the alarm trigger module 14 is connected to the rear end of the resistor in the RC series circuit 12. An alarm-triggering signal is outputted by processing the voltage signal of the resistor rear end in the RC series circuit 12, such that the insulation monitoring of the vehicle battery can be performed.

It should be noted that, in this embodiment, since the alarm-triggering signal is outputted by monitoring the voltage signal of the resistor rear end in the RC series circuit 12, hereinafter, for the convenience of description, sometimes the rear end of the resistor in the RC series circuit 12 is referred to as the voltage sampling point, correspondingly, the voltage signal of the resistor rear end in the RC series resistor is referred to as the voltage sampling signal.

In an embodiment of the present application, since the voltage-to-frequency conversion circuit is configured for outputting a low-frequency pulse signal according to the voltage signal of its input terminal and injecting the low-frequency pulse signal into a high-voltage system connected to the vehicle battery via the RC series circuit, the alarm trigger module is configured for processing the voltage signal of the resistor rear end in the RC series resistor and outputting an alarm-triggering signal, and the entire insulation monitoring process is not controlled by the battery management system of the vehicle, so as long as the vehicle battery is complete, the real-time insulation monitoring can be performed. At the same time, since a voltage signal of the resistor rear end in the RC series resistor is sampled and transferred back to the voltage-to-frequency conversion circuit such that the low-frequency pulse signal output by the voltage-to-frequency conversion circuit can be adapted to the capacitor in the high- and low-voltage circuits of the vehicle battery, a stable, reliable insulation monitoring can be performed.

Figure 2:
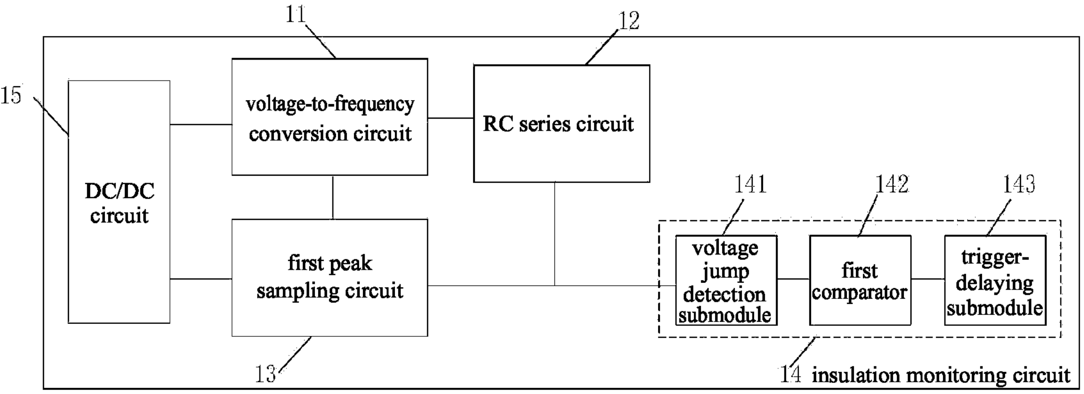
FIG. 2 is a schematic structural diagram of an insulation monitoring circuit for a vehicle battery provided in an embodiment of the present application.
Figure 3:
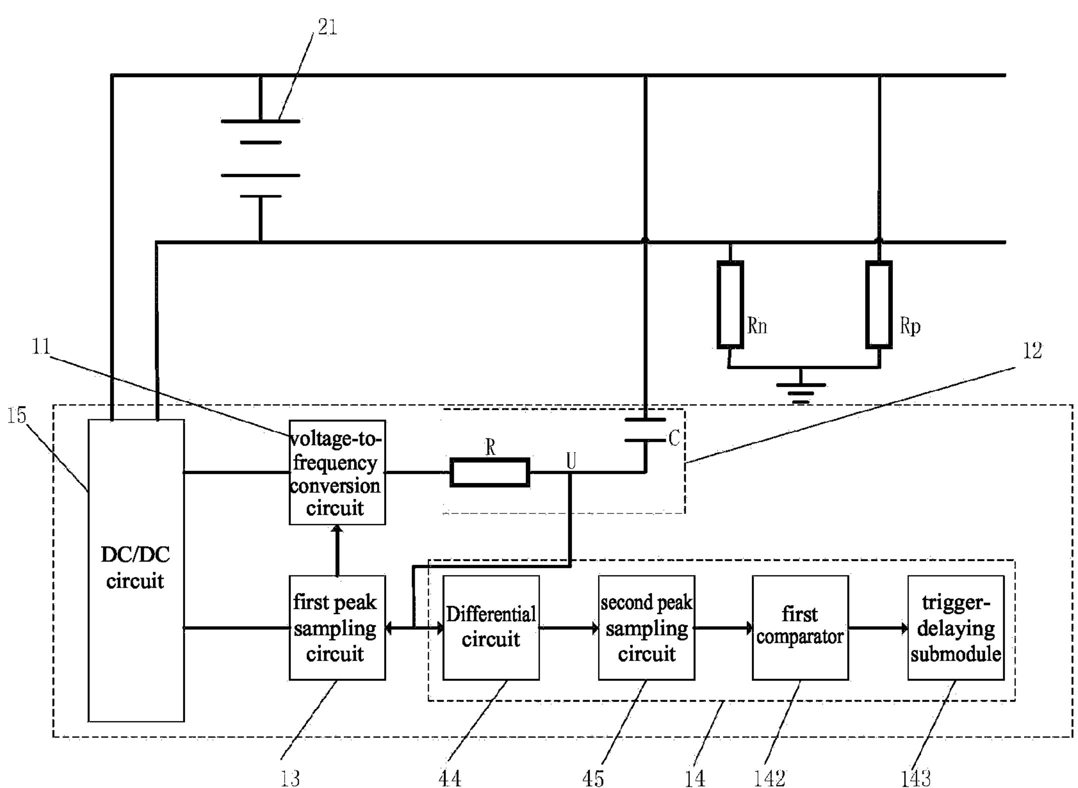
FIG. 3 is an exemplary structural diagram of the connection between an insulation monitoring circuit for a vehicle battery and the vehicle battery provided in an embodiment of the present application.

FIG. 2 is a schematic structural diagram of an insulation monitoring circuit for a vehicle battery provided in an embodiment of the present application. This embodiment further comprises a DC/DC circuit according to the embodiment shown in FIG. 1, and further describes the specific implementation of the alarm trigger module with details. With reference to FIG. 3, FIG. 3 is an exemplary structural diagram of the connection between an insulation monitoring circuit for vehicle battery and a vehicle battery provided in an embodiment of the present application. As shown in FIG. 3, the insulation monitoring circuit may further comprise a DC/DC circuit 15. An input terminal of the DC/DC circuit 15 is connected to the vehicle battery 21, and is configured for converting a DC high voltage of the vehicle battery 21 into a DC low voltage to supply power for other circuits and modules of the insulation monitoring circuit.

Again referring to FIGS. 2 and 3, in this embodiment, the alarm trigger module 14 comprises a voltage jump detection submodule 141 and a first comparator 142; the voltage jump detection submodule 141 is configured for detecting voltage jump signals of the resistor rear end in the RC series circuit 12 and generating second peak detection signals indicative of the peak value of the voltage jump signal; and the first comparator 142 is configured for comparing the second peak detection signal with a first preset voltage threshold such that an alarm-triggering signal is outputted in the case that the second peak detection signal is below the first preset voltage threshold.

Specifically, an input terminal of the voltage jump detection submodule 141 is connected to a second end of the resistor in the RC series circuit 12; an output terminal of the voltage jump detection submodule 141 is connected to a non-inverting input terminal of the first comparator 142; the voltage jump detection submodule 141 is configured for detecting the voltage jump signal of the second end of the resistor in the RC series circuit 12, generating a second peak detection signal indicative of the peak value of the voltage jump signal and providing the second peak detection signal to the non-inverting input terminal of the first comparator 142. Since the voltage jump signal of the second end of the resistor in the RC series circuit 12 is positively correlated with the insulation resistance of the vehicle battery, the first comparator 142 is configured for comparing the second peak detection signal with a first preset voltage threshold of its inverting input terminal such that an alarm-triggering signal is outputted in the case that the second peak detection signal is below the first preset voltage threshold. It should be noted that the first preset voltage threshold may be set according to actual requirements, which is not limited in this embodiment.

In this embodiment, the specific implementation of the voltage jump detection submodule is not limited. Optionally, in an embodiment of the application (see FIG. 3), the voltage jump detection submodule 141 comprises a differential circuit 44. The differential circuit 44 is connected to the resistor rear end in the RC series circuit 12 and configured for differentiating the voltage signal of the resistor rear end in the RC series circuit 12 and generating a voltage jump signal. Optionally, in another embodiment of the present application, the voltage jump detection submodule 141 further comprises a second peak sampling circuit 45. The second peak sampling circuit 45 is connected to an output terminal of the differential circuit 44 and configured for sampling the voltage jump signal and providing the second peak detection signal indicative of the peak value of the voltage jump signal.

In order to enhance the stability of the insulation monitoring system, optionally, as shown in FIG. 2, the alarm trigger module 14 further comprises a trigger-delaying submodule 143. The trigger-delaying submodule 143 is connected to an output terminal of the first comparator 142 and configured for outputting an alarm-triggering signal in the case that the output signal of the first comparator 142 indicates that the insulation value of the vehicle battery is relatively low for a period of time.

Specifically, in the case that the second peak detection signal is below the first preset voltage threshold, the first comparator 142 outputs an output signal indicating that the insulation value of the vehicle battery is relatively low. The trigger-delaying submodule performs delay alarm processing on the output signal, and is configured for outputting an alarm-triggering signal in the case that an output signal of the first comparator 142 indicates that the insulation value of the vehicle battery is relatively low for a period of time, such that a false alarm can be avoided in the case that the output signal of the first comparator 142 is directly seen as an alarm-triggering signal. It enhances the stability of the insulation monitoring system.

Optionally, in an implementation of this embodiment, the trigger-delaying submodule 143 comprises an integration circuit and a second comparator. An input terminal of the integrating circuit is connected to an output terminal of the first comparator 142. An output terminal of the integrating circuit is connected to a non-inverting input terminal of the second comparator. An inverting input terminal of the second comparator is connected to the second preset voltage threshold. The integrating circuit is configured for integrating the output signal of the first comparator 142 to generate a signal accumulation value. The second comparator is configured for outputting the alarm-triggering signal in the case that the signal accumulation value is above the second preset voltage threshold. In this embodiment, the specific implementation of the integrating circuit is not limited. For example, the integrating circuit may be an integrating circuit composed of a resistor and a capacitor; different delay effects can be achieved in the case that the delay is set by adjusting the size of the resistor and capacitor according to actual requirements.

In the embodiment of the present application, since the voltage-to-frequency conversion circuit is configured for outputting a low-frequency pulse signal according to the voltage signal of its input terminal and injecting the low-frequency pulse signal into a high-voltage system connected to the vehicle battery via the RC series circuit, the alarm trigger module is configured for processing the voltage signal of the resistor rear end in the RC series circuit to output an alarm-triggering signal, and the entire insulation monitoring process is not controlled by the battery management system of the vehicle, so as long as the vehicle battery is complete, the real-time insulation monitoring can be performed. At the same time, since a voltage signal of the resistor rear end in the RC series resistor is sampled and transferred back to the voltage-to-frequency conversion circuit such that the low-frequency pulse signal outputted by the voltage-to-frequency conversion circuit can be adapted to the capacitor in the high- and low-voltage circuits of the vehicle battery, a stable, reliable insulation monitoring can be performed. In addition, this embodiment also delays the triggering of the submodules and is configured for outputting alarm-triggering signals in the case that the insulation value is detected to be too low for a period of time. It further enhances the stability of the insulation monitoring system.

In order to facilitate the understanding of this embodiment, the working principle of the insulation monitoring circuit provided by this embodiment will be described below with a specific example.

Figure 4:
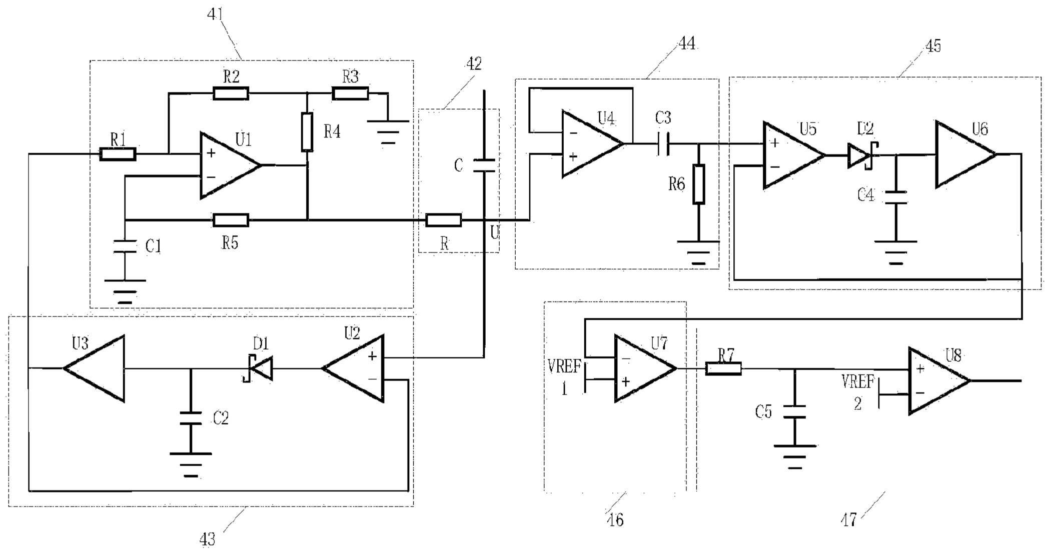
FIG. 4 is an exemplary circuit diagram of an insulation monitoring circuit for a vehicle battery provided in an embodiment of the present application.

FIG. 4 is a circuit diagram of an insulation monitoring circuit for vehicle provided by the embodiment of the present application. As shown in FIG. 4, the insulation monitoring circuit provided by this embodiment comprises a voltage-to-frequency conversion circuit 41, an RC series circuit 42, a first peak sampling circuit 43, a differential circuit 44, a second peak sampling circuit 45, a first comparator 46 and a trigger-delaying circuit 47.

As shown in FIG. 4, the voltage-to-frequency conversion circuit 41 comprises a first operational amplifier U1, a first resistor R1, a second resistor R2, a third resistor R3, a fourth resistor R4, a fifth resistor R5 and a first capacitor C1. Therein, a non-inverting input terminal of the first operational amplifier U1 is respectively connected to an output terminal of the first peak sampling circuit 43 via the first resistor R1 and connected to the ground voltage via the second resistor R2 and the third resistor R3, and an inverting input terminal of the first operational amplifier U1 is connected to the ground voltage via the first capacitor. An output terminal of the first operational amplifier U1 is connected to the first end of the resistor in the RC series circuit 42, connected to a node at the connection position of the second resistor R2 and the third resistor R3 via the fourth resistor R4, and connected to the inverting input terminal of the first operational amplifier U1 via the fifth resistor R5, respectively. The voltage-to-frequency conversion circuit 41 is configured for converting the voltage signal of its input terminal into a low-frequency pulse signal. The low-frequency pulse signal is injected into a high-voltage system connected to the vehicle battery via the RC series circuit 42.

The first peak sampling circuit 43 comprises a second operational amplifier U2, a first peak detector diode D1, a second capacitor C2 and a first voltage buffer U3. A non-inverting input terminal of the second operational amplifier U2 is connected to a second end of the resistor in the RC series circuit 42. A negative-inverting input terminal of the second operational amplifier U2 is connected to an output terminal of the first voltage buffer U3. An output terminal of the second operational amplifier U2 is connected to an input terminal of the first voltage buffer U3 and a first end of the second capacitor C2 via the first peak detector diode D1. A second end of the second capacitor C2 is connected to the ground voltage. An output terminal of the first voltage buffer U3 is connected to a non-inverting input terminal of the first operational amplifier U1 in the voltage-to-frequency conversion circuit 41 via the first resistor R1. The first peak sampling circuit 43 is configured for sampling a voltage signal of a resistor rear end in the RC series circuit. The first peak detection signal indicative of the peak value of the voltage signal is transferred back to the voltage-to-frequency conversion circuit 41 such that the low-frequency pulse signal outputted by the voltage-to-frequency conversion circuit 41 can be adapted to the vehicle battery.

The differential circuit 44 comprises a third operational amplifier U4, a third capacitor C3 and a sixth resistor R6. A non-inverting input terminal of the third operational amplifier U4 is connected to a second end of the resistor in the RC series circuit 42. An inverting input terminal of the third operational amplifier U4 is connected to its output terminal. An output terminal of the third operational amplifier U4 is connected to an input terminal of the second peak sampling circuit 45 and a first end of the sixth resistor R6 via the third capacitor C3. A second end of the sixth resistor R6 is connected to the ground voltage. An inverting input terminal of the third operational amplifier U4 is connected to its output terminal and forms a voltage follower to regulate the voltage signal of the resistor rear end in the RC series circuit. The third capacitor and the sixth resistor form a differential circuit to extract the differential characteristic voltage of the regulated voltage signal as the voltage jump signal.

The second peak sampling circuit 45 comprises a fourth operational amplifier U5, a second peak detector diode D2, a fourth capacitor C4 and a second voltage buffer U6. A non-inverting input terminal of the fourth operational amplifier U5 is connected to an output terminal of the differential circuit 44. An inverting input terminal of the fourth operational amplifier U5 is connected to an output terminal of the second voltage buffer U6. An output terminal of the fourth operational amplifier U5 is connected to a first end of the fourth capacitor C4 and an input terminal of the second voltage buffer U6 via the second peak detector diode D2. A second end of the fourth capacitor C4 is connected to the ground voltage. An output terminal of the second voltage buffer U6 is connected to the inverting input terminal of the first comparator. The second peak sampling circuit is configured for sampling the voltage jump signal outputted by the differential circuit and providing the second peak detection signal indicative of the peak value of the voltage jump signal. The first comparator 46 is configured for comparing the second peak detection signal with the first preset voltage threshold such that an alarm-triggering signal is outputted in the case that the second peak detection signal is below the first preset voltage threshold.

The trigger-delaying circuit 47 comprises a seventh resistor, a fifth capacitor C5 and a second comparator U8. A first end of the seventh resistor R7 is connected to an output terminal of the first comparator. A second end of the seventh resistor R7 is connected to a first end of the fifth capacitor C5 and a non-inverting input terminal of the second comparator U8. A second end of the fifth capacitor C5 is connected to the ground voltage, and an inverting input terminal of the second comparator U8 is connected to the second preset voltage threshold. Therein, the seventh resistor R7 and the fifth capacitor C5 form an integrating circuit, which is configured for integrating the output signal of the first comparator to generate a signal accumulation value. The second comparator U8 is configured for outputting an alarm signal in the case that the signal accumulation value is above the second preset voltage threshold.

Specifically, the voltage-to-frequency conversion circuit 41 is configured for converting the voltage signal of its input terminal into a low-frequency pulse signal. The low-frequency pulse signal is injected into a high-voltage system connected to the vehicle battery via the RC series circuit 42. After the voltage-to-frequency conversion circuit 41 outputs the low-frequency pulse signal, the voltage signal of the second end of the resistor in the RC series circuit 42 charges the second capacitor C2 via the second operational amplifier U2 and the first peak detector diode D1, it enters the first voltage buffer U3 after peak hold being performed. Following passing through the first voltage buffer U3, it is transferred back to the voltage-to-frequency conversion circuit 41 as the first peak detection signal, thereby enabling the voltage-to-frequency conversion circuit 41 to adjust the output signal according to the first peak detection signal, to output a suitable low-frequency pulse signal, that is, the peak value of the low-frequency pulse signal is consistent with the voltage of the second end of the resistor in the RC series circuit 42.

In the case that the low-frequency pulse signal outputted by the voltage-to-frequency conversion circuit 41 is stable, an inverting input terminal of the third operational amplifier U4 is connected to its output terminal and forms a voltage follower to regulate the voltage of the resistor rear end in the RC series circuit; the third capacitor and the sixth resistor form a differential circuit to extract the differential characteristic voltage of the voltage signal as a voltage jump signal. The second peak sampling circuit composed of the fourth operational amplifier U5, the second peak detector diode D2, the fourth capacitor C4 and the second voltage buffer U6, is configured for sampling the voltage jump signal outputted by the differential circuit and providing a second peak detection signal indicative of the peak value of the voltage jump signal. The first comparator 46 is configured for comparing the second peak detection signal with the first preset voltage threshold such that a signal is outputted to the integrating circuit composed of the seventh resistor R7 and the fifth capacitor C5 in the case that the second peak detection signal is below the first preset voltage threshold. The integrating circuit performs integral processing on the output signal of the first comparator, generates a signal accumulation value, and inputs it to a non-inverting input terminal of the second comparator U8. The second comparator is configured for comparing the signal accumulation value with the second preset voltage threshold. An alarm-triggering signal is outputted in the case that the signal accumulation value is above the second preset voltage threshold.

In this embodiment, the entire insulation monitoring process may be not controlled by the BMS of the vehicle, so as long as the vehicle battery is complete, the real-time insulation monitoring can be performed. At the same time, a closed-loop is configured for outputting the low-frequency pulse signal, which is adapted to the capacitor between the high- and low-voltage circuits of the vehicle battery, such that a stable, reliable insulation monitoring can be performed. In addition, the trigger-delaying submodule is configured for outputting the alarm-triggering signal in the case that the insulation value is detected to be too low for a period of time. It further enhances the stability of the insulation monitoring system.

This embodiment provides a vehicle, comprising a vehicle battery and an insulation monitoring circuit for vehicle battery as provided in the embodiments shown in FIGS. 1 to 4. The insulation monitoring circuit is configured for monitoring the insulation condition of the vehicle battery and giving an alarm in the case that there is an insulation problem in the vehicle battery. Its technical effect and working principle are similar and will not be repeated here.

Each embodiment in this specification is described in a progressive manner, the same and similar parts of each embodiment can be referred to each other, and each embodiment focuses on the differences from other embodiments. In particular, for the system embodiment, since it is basically similar to the method embodiment, the description is relatively simple, and the relevant parts can refer to parts of the description of the method embodiment.

The above descriptions are only embodiments of the present application, and are not intended to limit the present application. For those skilled in the art, various modifications and changes may occur in this application. Any modification, equivalent replacement, improvement and the likes made within the spirit and principle of the present application shall be included within the scope of the claims of the present application.

The invention claimed is:

1. An insulation monitoring circuit for a vehicle battery, wherein the insulation monitoring circuit obtains power supply from the vehicle battery, and the insulation monitoring circuit comprises:

a voltage-to-frequency conversion circuit, an RC series circuit, a first peak sampling circuit, and an alarm trigger module;

wherein the RC series circuit is formed by a resistor and a capacitor connected in series, a front end of the resistor being connected to an output terminal of the voltage-to-frequency conversion circuit, a rear end of the resistor being connected to a front end of the capacitor, and a rear end of the capacitor being connected to a high-voltage system connected to the vehicle battery;

wherein the voltage-to-frequency conversion circuit is configured for converting the voltage signal at its input terminal to a low-frequency pulse signal, and injecting the low-frequency pulse signal into a high-voltage system connected to the vehicle battery via the RC series circuit;

wherein an input terminal of the first peak sampling circuit is connected to the rear end of the resistor in the RC series circuit, and is configured for sampling a voltage signal of a resistor rear end in the RC series circuit; and wherein an output terminal of the first peak sampling circuit is connected to an input terminal of the voltage-frequency conversion circuit for transferring a first peak detection signal indicative of the peak value of the voltage signal back to the voltage-to-frequency conversion circuit such that the low-frequency pulse signal output by the voltage-to-frequency conversion circuit is adapted to the vehicle battery and a low-frequency pulse signal outputted by a closed loop is realized;

wherein the alarm trigger module is configured for processing the voltage signal of the resistor rear end in the RC series circuit, and outputting an alarm-triggering signal;

wherein the alarm trigger module comprises:

a voltage jump detection submodule and a first comparator; an output terminal of the voltage jump detection submodule being connected to a non-inverting input end of the first comparator;

wherein the voltage jump detection submodule comprises a differential circuit;

wherein the differential circuit is connected to the resistor rear end in the RC series circuit and is configured for differentiating the voltage signal of the resistor rear end in the RC series circuit, generating a voltage jump signal;

wherein the voltage jump detection submodule further comprises a second peak sampling circuit, the second peak sampling circuit is connected to an output terminal of the differential circuit and is configured for sampling the voltage jump signal and providing the second peak detection signal indicative of the peak value of the voltage jump signal;

wherein the first comparator is configured for comparing the second peak detection signal with a first preset voltage threshold at an inverting input terminal of the first comparator, such that the alarm-triggering signal is outputted in the case that the second peak detection signal is below the first preset voltage threshold.

2. The insulation monitoring circuit for a vehicle battery according to claim 1, wherein the alarm trigger module further comprises a trigger-delaying submodule, wherein the trigger-delaying submodule is connected to an output terminal of the first comparator and is configured for outputting an alarm-triggering signal in the case that an output signal of the first comparator indicates that the insulation value of the vehicle battery is relatively low for a period of time.

3. The insulation monitoring circuit for a vehicle battery according to claim 2, wherein the trigger-delaying submodule comprises an integrating circuit and a second comparator, wherein an input terminal of the integrating circuit is connected to the output terminal of the first comparator, an output terminal of the integrating circuit is connected to a non-inverting input terminal of the second comparator, and an inverting input terminal of the second comparator is connected to a second preset voltage threshold;

wherein the integrating circuit is configured for integrating the output signal of the first comparator to generate a signal accumulation value, and wherein the second comparator is configured for outputting the alarm-triggering signal in the case that the signal accumulation value is above the second preset voltage threshold.

4. A vehicle, comprising a vehicle battery and an insulation monitoring circuit for a vehicle battery according to claim 3.

5. A vehicle, comprising a vehicle battery and an insulation monitoring circuit for a vehicle battery according to claim 2.

6. The insulation monitoring circuit for a vehicle battery according to claim 1, wherein the voltage-to-frequency conversion circuit comprises a first operational amplifier, a first resistor, a second resistor, a third resistor, a fourth resistor, a fifth resistor and a first capacitor;

wherein a non-inverting input terminal of the first operational amplifier is respectively connected to an output terminal of the first peak sampling circuit via the first resistor and connected to the ground voltage via the second resistor and the third resistor;

wherein an inverting input terminal of the operational amplifier is connected to the ground voltage via the first capacitor;

wherein an output terminal of the first operational amplifier is respectively connected to the resistor rear end in the RC series circuit, connected to a node at the connection position of the second resistor and the third resistor via the fourth resistor, and connected to the inverting input terminal of the first operational amplifier via the fifth resistor.

7. A vehicle, comprising a vehicle battery and an insulation monitoring circuit for a vehicle battery according to claim 6.

8. The insulation monitoring circuit for a vehicle battery according to claim 1, wherein the first peak sampling circuit comprises a second operational amplifier, a first peak detector diode, a second capacitor and a first voltage buffer, wherein a non-inverting input terminal of the second operational amplifier is connected to a second end of the resistor in the RC series circuit, wherein a negative-inverting input terminal of the second operational amplifier is connected to an output terminal of the first voltage buffer, wherein an output terminal of the second operational amplifier is connected to an input terminal of the first voltage buffer and a first end of the second capacitor via the first peak detector diode, wherein a second end of the second capacitor is connected to the ground voltage, and wherein an output terminal of the first voltage buffer is connected to an input terminal of the voltage-to-frequency conversion circuit.

9. A vehicle, comprising a vehicle battery and an insulation monitoring circuit for a vehicle battery according to claim 8.

10. The insulation monitoring circuit for a vehicle battery according to claim 1, further comprising a DC/DC circuit, wherein an input terminal of the DC/DC circuit is connected to the vehicle battery for converting the DC high voltage of the vehicle battery into DC low voltage to supply power for the insulation monitoring circuit.

11. A vehicle, comprising a vehicle battery and an insulation monitoring circuit for a vehicle battery according to claim 10.

12. A vehicle comprising a vehicle battery and an insulation monitoring circuit for a vehicle battery according to claim 1.

* * * * *